United States Patent [19]

Kock et al.

[11] Patent Number: 5,289,585
[45] Date of Patent: Feb. 22, 1994

[54] MULTIPROCESSOR SYSTEM HAVING A SYSTEM BUS FOR THE COUPLING OF SEVERAL PROCESSING UNITS WITH APPERTAINING PRIVATE CACHE MEMORIES AND A COMMON MAIN MEMORY

[75] Inventors: Juergen Kock, Grafing; Peter Mooshammer; Wilfried Rottmann, both of Munich; Erich Taeuber, Sauerlach, all of Fed. Rep. of Germany

[73] Assignee: Siemens Nixdorf Informationssysteme AG, Fed. Rep. of Germany

[21] Appl. No.: 917,684

[22] Filed: Jul. 22, 1992

Related U.S. Application Data

[63] Continuation of Ser. No. 673,527, Mar. 22, 1991, abandoned.

[30] Foreign Application Priority Data

Mar. 26, 1990 [EP] European Pat. Off. ............ 90105710

[51] Int. Cl.$^5$ ...................... G06F 13/14; G06F 13/38
[52] U.S. Cl. ..................... 395/325; 395/200; 395/700; 364/240; 364/240.9; 364/242.6; 364/242.92; 364/937.01; 364/975.2; 364/DIG. 2; 364/80.2
[58] Field of Search .................. 364/DIG. 1, DIG. 2; 395/200

[56] References Cited

U.S. PATENT DOCUMENTS

| | | | |
|---|---|---|---|
| 3,787,627 | 1/1974 | Abramson et al. | 179/15 |
| 4,219,873 | 8/1980 | Kober et al. | 364/200 |
| 4,349,871 | 9/1982 | Lary | 364/200 |
| 4,562,535 | 12/1985 | Vincent et al. | |
| 4,622,631 | 11/1986 | Frank et al. | 364/200 |
| 4,661,905 | 4/1987 | Bomba et al. | 364/200 |
| 4,737,932 | 4/1988 | Baba | 364/900 |
| 4,763,249 | 8/1988 | Bomba et al. | 395/325 |
| 4,866,604 | 9/1989 | Reid | 395/325 |
| 4,933,846 | 6/1990 | Humphrey et al. | 364/200 |
| 4,942,540 | 7/1990 | Black et al. | 364/514 |
| 4,964,038 | 10/1990 | Louis et al. | 364/200 |
| 5,038,320 | 8/1991 | Heath et al. | 364/900 |
| 5,058,006 | 10/1991 | Durdan et al. | 364/200 |
| 5,060,139 | 10/1991 | Theus | 364/200 |
| 5,067,071 | 11/1991 | Schanin et al. | 395/274 |
| 5,150,464 | 9/1992 | Sidhu et al. | 395/200 |

FOREIGN PATENT DOCUMENTS

0192366  8/1986  European Pat. Off. ...... G06F 12/08

OTHER PUBLICATIONS

Sweazey, "Shared Memory Systems on the Futurebus," Spring Compcon 88, (1988), pp. 505–511.
Sweazey et al, "A Class of Compatible Cache Consistency Protocols . . . Futurebus," 13th Annual Symposium on Computer Architecture, 1986, pp. 414–423.
Fielland et al, "32-bit computer system . . . 12 processors", Electronic Design, vol. 32, No. 18, 1984, pp. 153–168.

Primary Examiner—Gareth D. Shaw
Assistant Examiner—L. Toplu
Attorney, Agent, or Firm—Hill, Steadman & Simpson

[57] ABSTRACT

A microprocessor system has a bus system for coupling several processing units, each having an appertaining private cache memory and a common main memory. When an address operation of a transaction is executed, a transaction identification number is generated and transmitted on the system bus to all other subscribers together with the fed address of the initiating subscriber. In each subscriber, memory means are provided for storing the transmitted address and the co-delivered transaction identification number. Simultaneously with the assignment of the system bus for further transmissions, the address stored in the memory means are monitored in test means of the subscribers, and after monitoring, a synchronization signal and possibly accompanying signals are set by all subscribers for the abortion or continuation of a transaction. Given continuation with a data operation, an allocation of the data operation to its corresponding address operation can be achieved by return transmission of the associated transaction identification number together with the data to the initiating subscriber, which permits that the sequential order of the data operations sequence is not bound to that of the corresponding address operations.

9 Claims, 5 Drawing Sheets

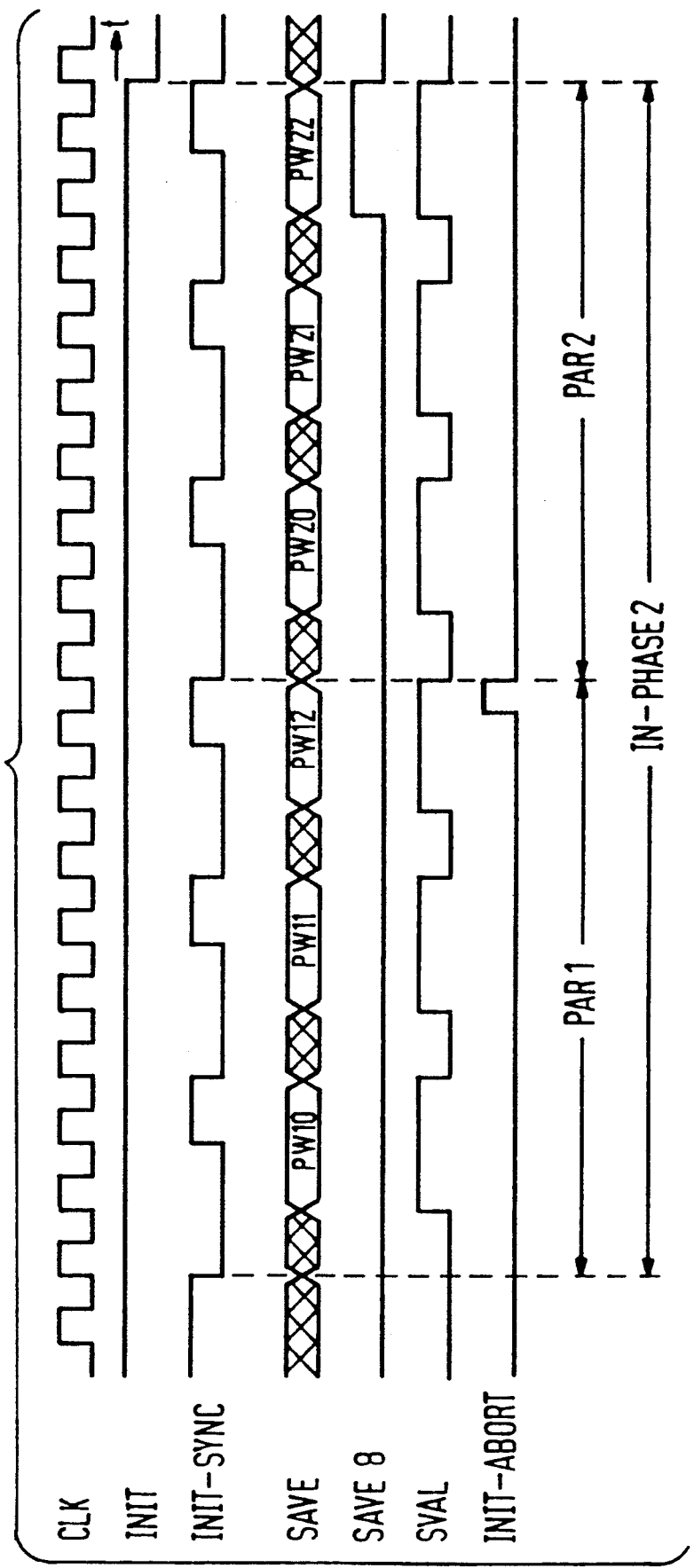

MULTIPROCESSOR SYSTEM HAVING A SYSTEM BUS FOR THE COUPLING OF SEVERAL PROCESSING UNITS WITH APPERTAINING PRIVATE CACHE MEMORIES AND A COMMON MAIN MEMORY

This is a continuation of application Ser. No. 673,527, filed Mar. 22, 1991 now abandoned.

BACKGROUND OF THE INVENTION

1. Field of the Invention

The present invention relates to a multiprocessor system with a system bus to which several processing units having appertaining private cache memories and a common joint memory are connected as subscribers/users.

2. Description of the Prior Art

The development of hardware and software technology in the last few years has led, to an increasing extent, to multiprocessor systems that are used in data processing systems for an increase of the system capacity. Multiprocessor systems of this type use a system bus for the coupling of several processing units with one common main memory. Apart from the low costs, such a system bus has the advantage that, as a standardized transmission medium, it must merely be developed once and can be expanded in capacity and function via the connection of additional, also different processing units in a relatively simple fashion.

Due to the high data traffic between the processing units and the main memory, the requirements of the system bus are very high. The average data access time in the system is determined by the access time of the main memory and the capacity of the system bus. Due to the relatively long access time of the main memory, despite increasing integration and speed of the available memory modules, an output that is sufficiently high in multiprocessor systems can only be achieved with assistance of the private cache memories respectively assigned to the individual processing units. Best suitable for this purpose are copyback caches whereby, contrary to write-through-caches where all write accesses basically also go to the main memory and therefore burden the system bus, data changes are permitted in the cache memory without the main memory having to be brought to the same level.

This results in the necessity of guaranteeing the data consistency in the system, since memory data can be present in the main memory as well as in one or several private cache memories simultaneously. This means that, in the case of each transaction, the current value must be preserved independently from the fact of whether the data have been stored only in the main memory or additionally in one or several cache memories, or they have been modified in the cache memory and still have the current value only in that cache memory.

The responsibility of the cache memory for the correctness of data in the entire system can be recognized from several states which can be assigned to each cache memory entry. They result in the so-called MOESI model which has been applied, for example, in connection with the IEEE Futurebus in the article by Paul Sweazey and Alan Jay Smith, entitled "A Class of Compatible Cache Consistency Protocols and Their Support by the IEEE Futurebus", published 1986 by the IEEE, and whose name derives from the initial letters of the states—Modified, Owned, Exclusive, Shared and Invalid, hence, the MOESI model.

A transaction initiated by a processing unit consists of a sequence of operations on the system bus, for example given a read transaction, first the address and, subsequently, the appertaining data are transmitted. With a simple "non-pipeline" operating mode, whereby merely one address can be transmitted, and then there is waiting for the data, already considerable downtimes at the system bus develop when the access time of the responding subscriber is only slightly larger than zero. These downtimes can be partially used for the transmission of further addresses, in that in the "pipelining" operating mode, the transmitted addresses can be processed in parallel fashion by the receiving subscribers. However, in order to guarantee a clear assignment, the sequence of the data operations is bound to the sequential order of the corresponding address operations. A satisfactory operation of the system bus can be achieved when the access times of the parallel-operating units are approximately equal.

Since in real systems, however, considerable differences may occur in the access times, for example due to disturbances from refresh, in/output accesses, cache memory interventions, etc., and in the transit times due to variously-long paths, the utilization of the system bus is not sufficient to achieve a better average data access time. Moreover, the data consistency monitoring of the private cache memories which is necessary for each assignment of the system bus, naturally requires a certain time, so that the assignment of the system bus for the subsequent transaction can only be started with a corresponding delay.

SUMMARY OF THE INVENTION

Therefore the object of the present invention is to optimize a system bus for a multiprocessor system with respect to its capacity.

The above object is achieved, according to the present invention, in a multiprocessor system with a system bus to which several processing units having appertaining private cache memories and a common main memory are connected as subscribers, an arbitrating unit is provided in which a transaction identification number is generated when assigning the system bus to a subscriber for an address operation of a transaction to be executed, the transaction identification number being transmitted via the system bus for all subscribers together with the address fed by the initiating subscriber, several control means for the coupling of the subscribers with the system bus, which respectively comprise a buffer memory for the parallel storage of the transmitted address at corresponding memory locations which are determined by the respectively-provided transaction identification number, as well as a respective memory for the parallel storage of the transmitted address and the assigned transaction identification number, test means in each subscriber, by which respectively simultaneously with further transmission via the system bus, the individual addresses contained in the memory are received in the sequence of their storing, as well as the responsibility of the subscriber for the data in the system is determined in that the respective addressed data are tested in the appertaining cache memory regarding consistency or in the common main memory regarding existence, and by which, respectively, after the performed tests, a signal for the synchronization is transmitted and, depending on the test result, additional accompanying signals for the termination or continuation of the transaction.

The generation of a transaction identification number which is used to associate an operation to its transaction enables the decoupling of the address operation and the data operation of an initiated transaction, for example a read transaction, so that the data responses can occur via the system bus out of the sequential order of the corresponding address operations. Quick responses reach the respective initiating subscriber earlier, slow responses later. The assignment of the data operation to its respective address operation is achieved via transmission of the associated transaction identification number during the data operation. The set-up of a pipeline is possible in that in each subscriber, a memory means to store the respectively transmitted address and the assigned transaction identification number is provided. The parallel storage of the transmitted address by each subscriber, including the transmitter itself, at that location in their own buffer memory which is determined by the transaction number results in that all subscribers have the same copy of the memory content.

The applied principle of the assignment of the system bus for subsequent transactions which lead to further entries in the buffer memories and memory means, and the separate monitoring of the addresses already filed at memory locations. corresponding to each other in the memory means of the individual subscribers leads to a higher throughput at the system bus and thus to the almost optimal use thereof.

After the performed monitoring, each subscriber provides a synchronization signal and, in connection with this signal, accompanying signals which determine the further destiny of the initiated transaction.

If a data operation pertains to the transaction, a further development and feature of the invention provides that the data and the appertaining identification number of the associated transaction are transmitted to the respective initiating subscriber as soon as they are available, however, the transmitted data may be stored only when the validation of the appertaining address operation by the synchronization signals of all subscribers has occurred for the associated transaction, and, consequently, the data consistency in the system guaranteed.

According to a further development and feature of the invention, separate input/output system buses are provided to which, additionally, processing units for the execution of input/output transactions are connected. This leads to a reduction of the data traffic on the system bus for the coupling of the processing units with the cache memories and the common main memory. Due to the possibility to connect several in/output system buses with equality of access, multiprocessor systems of high availability can be created.

Other further developments and features of the invention are related to the accompanying signals that can be transmitted in addition to the synchronization signal, as well as to an initialization event on the system bus.

BRIEF DESCRIPTION OF THE DRAWINGS

Other objects, features and advantages of the invention, its organization, construction and operation will be best understood from the following detailed description, taken in conjunction with the accompanying drawings, on which:

FIGS. 4a and 4b are timing diagrams of the pulses of the signals on the system bus which occur during the initialization event.

DESCRIPTION OF THE PREFERRED EMBODIMENTS

Figure 1:
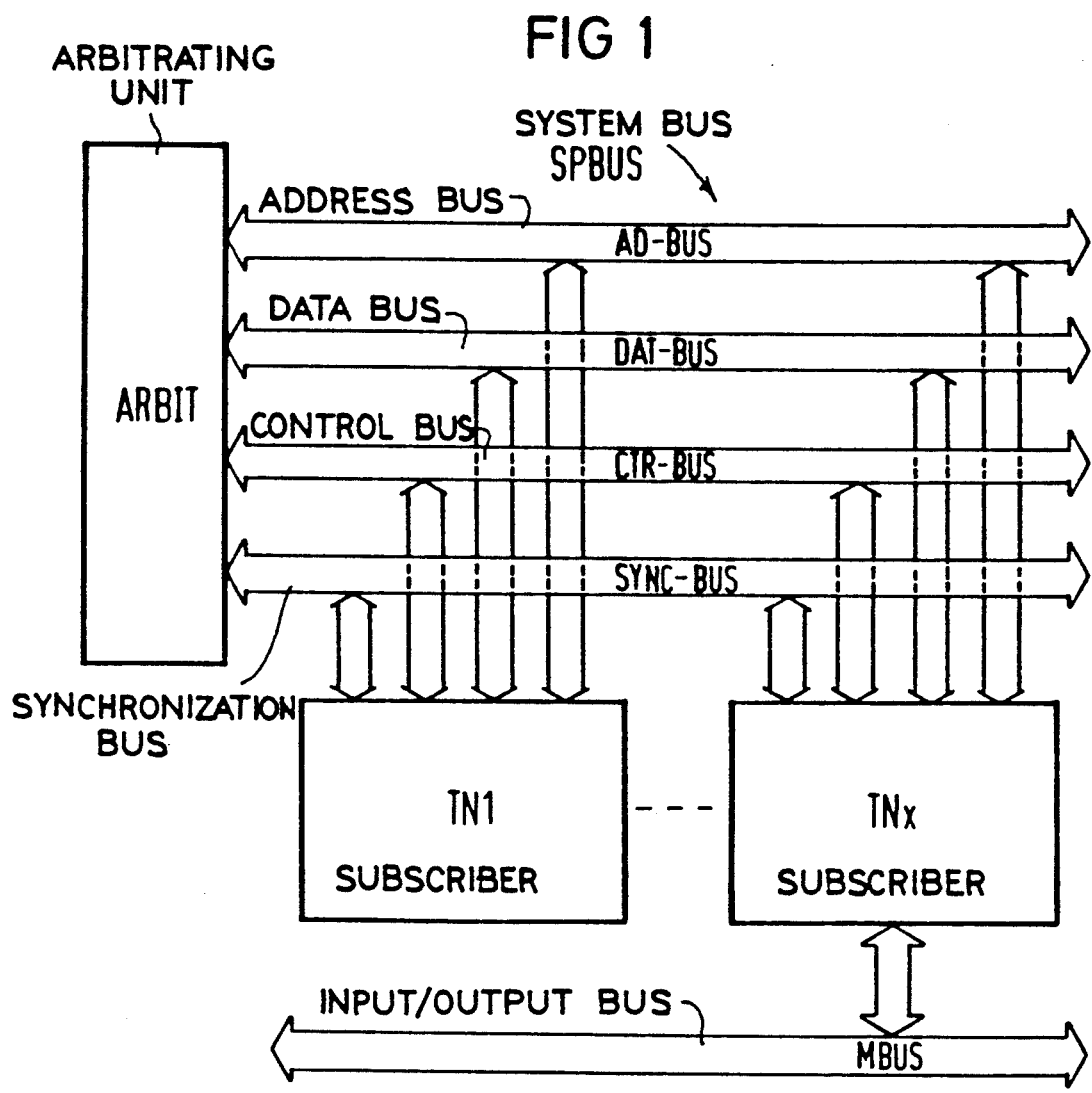
FIG. 1 is a schematic representation of a multiprocessor system having a system bus for the coupling of several subscribers.

FIG. 1 illustrates a multiprocessor system in which several subscribers TN1-TNx can communicate with each other via a system bus SPBUS.

Among the subscribers TN1-TNx are processing units with appertaining private cache memories, a main memory jointly used by all processing units, as well as separate processing unit for the implementation of input/output (I/O) transactions. Therefore, an additional bus MBUS is arranged to which each input/output processing unit, e.g. the subscriber TNx, is connected which leads to a relief of the system bus SPBUS. The two buses SPBUS and MBUS, separated from one another, are backplane buses, whereby several input/output backplane buses MBUS can be connected with the bus SPBUS with equality of access. In doing so, a multiprocessor system of high availability can be realized.

The system bus SPBUS for supporting tightly-coupled shared memory multiprocessors comprises several sub-buses which operate independently from one another, of which there is an address bus AD-BUS, a data bus DAT-BUS, a control bus CTR-BUS, and a synchronization bus SYNC-BUS, whereby the individual signal lines are extended and connected to each subscriber. Since several transactions initiated by the individual subscribers TN1-TNx can occur simultaneously, an arbitrating unit ARBIT takes care of the assignment of the system bus SPBUS to one of the transactioning subscribers, in that the corresponding sub-buses are made available thereto for an address operation or a data operation.

Figure 2:
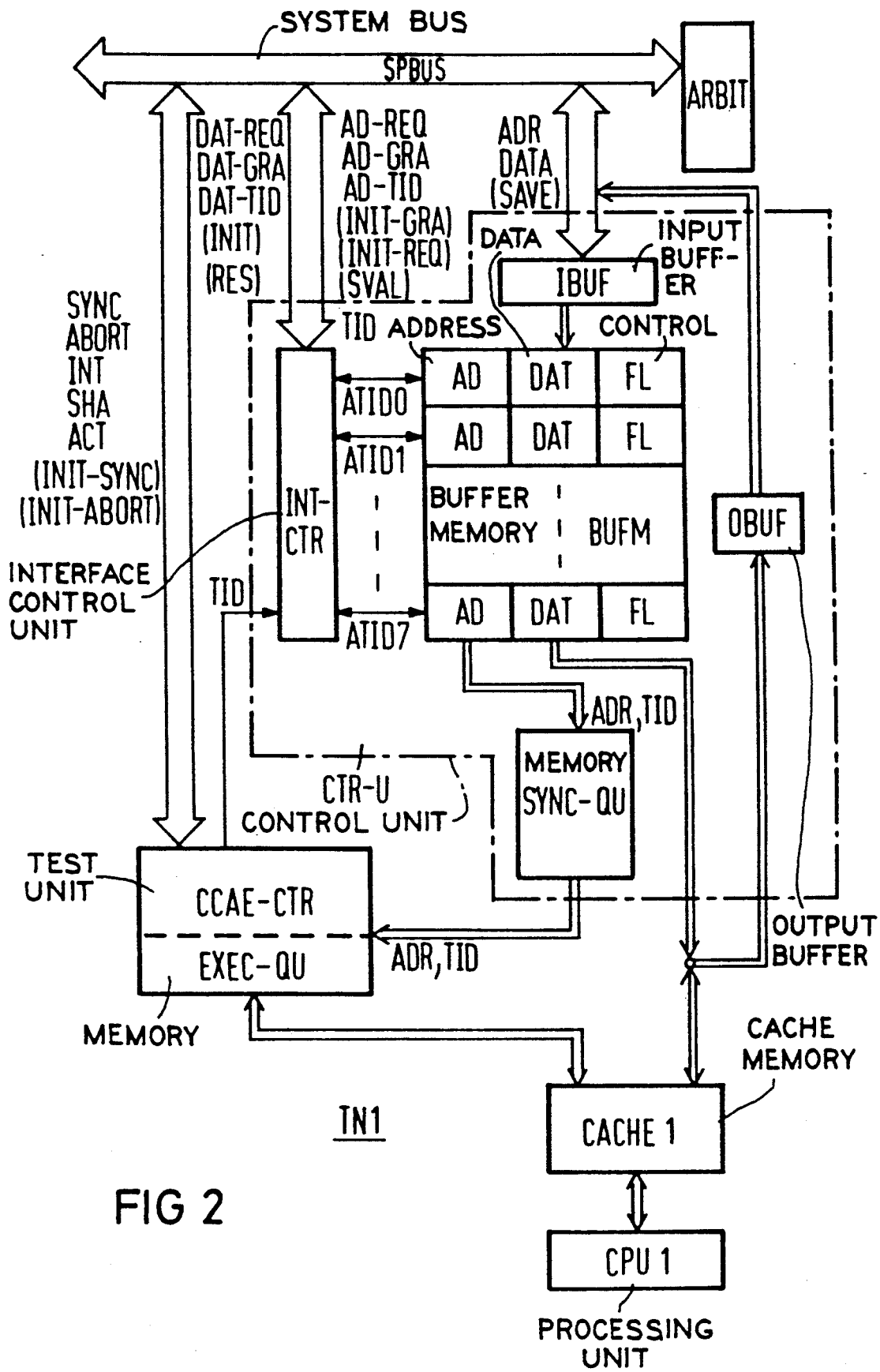
FIG. 2 is a schematic representation of the structure of a subscriber exemplified with a processing unit having an appertaining cache memory.

FIG. 2 illustrates the structure of a subscriber TN1 exemplified with a processing unit CPU1, a cache memory CACHE1, which is preferably fashioned as a copy-back cache memory. The communication between the individual subscribers of the multiprocessor system by information transmissions and via the system bus SPBUS composed of the individual sub-buses will be explained with various transaction possibilities of the processing unit CPU1. A transaction thereby consists of either merely an address operation, or an address operation followed by a data operation.

In the event that, given a read transaction of the processing unit CPU1 the addressed data cannot be made available by the appertaining cache memory CACHE1 (MISS in the cache memory), the subscriber TN1 intends to initiate a transaction by initiating an access to the sub-bus AD-BUS according to FIG. 1. For that purpose, radially extending signal lines AD-REQ and AD-GRA are provided which connect, respectively, one subscriber with the central arbitrating unit ARBIT. If, after sending out the signal AD-REQ for the transaction, the subscriber TN1 has granted access from the arbitrating unit ARBIT with the signal AD-GRA the respective address ADR which has been read from the cache memory CACHE1 before and buffered in the address register of an output buffer OBUF, is fed to the sub-bus AD-BUS according to FIG. 1.

With the allocation of the signal AD-GRA, a transaction identification number TID is generated by the arbitrating unit ARBIT and transmitted with the maximum clock frequency via the address lines AD-TID together with the address ADR to all other subscribers via the corresponding address bus. In the transmitter TN1 who drives the address bus, as well as in all receivers which basically have the same structure as the subscriber TN1 (for example, instead of the test means for the data consistency of the cache memories, a corresponding test unit for the main memory in the appertaining subscriber is provided) the address ADR is first stored in an address register of an input buffer IBUF.

The also transmitted transaction identification number TID for the address operation reaches an interface control unit INT-CTR, in which, from the identification number, address instructions ATID0-ATID7 are derived for the addressing of the individual entries of a buffer memory BUFM, which are respectively composed of an address portion AD, a data portion DAT, and a control portion FL. In the buffer memory BUFM of the control unit CTR-U of each subscriber, the transmitted address ADR is respectively written into the address portion of the entry, which is determined by one of the informations (instructions) ATID0-ATID7. Therefore, an identical image of the memory entries at memory locations corresponding to one another is present in all buffer memories BUFM. The location in the buffer memory is clearly defined by the transaction identification number TID, the characterization address or data by an additional status information FL whose meaning is of less importance here.

Simultaneously with inscribing in the buffer memory BUFM, a respective writing of the address ADR, together with the assigned identification number TID into a further memory unit SYNC-QU takes place, which is fashioned as a FIFO memory (First-In-First-Out), with a memory depth corresponding to the number of individual address informations ATID0-ATID7. This results in a pipeline in that the accumulating transactions are respectively assigned an identification number which is used to associate an operation to its appertaining transaction, and the transmitted addresses of the address operations with the allocated identification numbers are first buffered in the sequence of their initialization in order to be able to immediately free the system bus SPBUS for subsequent operations.

Simultaneously with further transmissions on the system bus SPBUS, all system subscribers check their appertaining cache memories or, respectively, the main memory regarding possible data consistency conflicts or the presence of the desired data in that the address ADR that was last stored in the memory SYNC-QU is transferred to the corresponding test means CCAE-CTR.

Having performed the test, each subscriber asserts the signal SYNC on the system bus SPBUS and maintains it, until all subscribers have asserted this signal for a cycle on the system bus SPBUS. The synchronization signals SYNC are open-collector signals and ANDed on their respective bus line.

Simultaneously with the signal SYNC, further signals which indicate possible conflicts and are therefore responsible for the forwarding of a transaction or the termination thereof can be generated by the respective test means CCAE-CTR. Therefore, the signal SHA indicates that the data appertaining to the address instantaneously held ready are present in the cache memory of the subscriber, and that this one wishes to keep those data even after the execution of the appertaining transaction, whereby those data are characterized by the states S (Shared) given their non-modification, and O (Owned) given their modification. Data, whose valid copy is exclusively contained in one of the cache memories, are determined by the states E (Exclusive) or M (Modified), if they were not modified or, respectively, modified (see MOESI-model). The signal SHA is necessary so that the cache memories can decide which states of the signal pairs S, E or O, M they are to take on. The signal INT enables a subscriber to intervene, for example, when in the case of an access to a certain data block, the appertaining cache memory has this block in the state M (Modified) so that this cache memory is responsible for the integrity of the data in the entire system. Consequently, the requested data are made available during the corresponding data operation of the read transaction from the responsible cache memory and not from the main memory. The state of the respective data block changes to O (Owned) whereas the initiating subscriber allocates these data in its appertaining cache memory to the state S (Shared). The state O (Owned) means that this cache memory continues to be responsible for keeping up the data consistency in the case of accesses to these data.

The signal ABORT indicates that the transaction must not be continued at the moment. An abortion takes place, for example, when data areas in a cache memory are temporarily protected from accesses of other processing units and are therefore blocked. The subscriber triggering the transaction can initialize it again at a later time. The accompanying signals INT, ABORT and SHA are likewise open-collector signals which, contrary to the signal SYNC on the system bus SPBUS, are ORed on their respective bus line.

If the read transaction concerns a data block which has not been stored in a cache memory of the responding subscribers, the data are provided by the subscriber with the joint or common main memory. For this purpose, the address ADR together with the transaction identification number TID is deposited in a further memory unit EXEC-QU of the subscriber, which is fashioned in a manner similar to that of the memory SYNC-QU as a FIFO memory, and is equipped with the memory depth of eight entries, when the respective signal SYNC is set by all subscribers.

The transaction begun with the address operation is continued in that, from the main memory, the data are entered into the data register of the output buffer OBUF of the control unit CTR-U, whereas the responding subscriber desires an assignment of the sub-bus DAT-BUS corresponding to FIG. 1 via the radially-extending signal line DAT-REQ. This has occurred via sending out the corresponding response signal DAT-GRA from the arbitrating unit ARBIT, the data DATA are taken out of the output buffer OBUF and transferred to the transmitter, e.g. subscriber TN1. The transmitter also transmits the transaction identification number TID via the data lines DAT-TID. For this purpose, first the identification number TID is read from the memory EXEC-QU and made available to the interface control unit INT-CTR, which finally transfers it on the lines DAT-TID of the sub-bus DAT-BUS according to FIG. 1.

The data DATA arriving at the subscriber TN1 are stored into the data register of the input buffer IBUF and, subsequently, the buffer memory BUFM. Thereby, the memory location is determined by the transmitted transaction identification number TID from which, again, an address information is generated which corresponds to the information for the corresponding address operation of the read transaction. Therefore, it is achieved that the respective transaction address ADR and the appertaining data DATA are stored in the same buffer memory entry. If the entry is declared valid (recognizable on one of the status signs FL) and if no error has occurred in the data transmission, the transmitted data can be entered from the buffer memory BUFM into the cache memory CACHE1 and they can be allocated the state E (EXCLUSIVE).

If the event occurs that the data of the data operation have already been sent via the sub-bus DAT-BUS according to FIG. 1 and deposited in the buffer memory BUFM before the corresponding address operation via the sub-bus AD-BUS according to FIG. 1 is validated by the signals SYNC of all subscribers, the transferred data may be stored and executed (e.g. change of cache memory state) in the cache memory CACHE 1 of the initiating subscriber, for example the subscriber TN1, after the validation the address operation and after no transmission occur has occurred in the data operation. This means the transactions are synchronized by the signals SYNC in the same sequence as they are initialized by the address operations on the sub-bus AD-BUS according to FIG. 1.

After the termination of the read transaction, the transaction identification number TID cannot be immediately reassigned, but only when it is declared by all subscribers as not occupied in a separate cycle provided therefor. In the selected exemplary embodiment, it is possible to treat up to eight transactions at the same time on the system bus SPBUS (pipelining), whereby the sequence of the individual data operations is not bound to the sequential order of the corresponding address operations. The data operations can be allocated to their appertaining transactions via the transaction identification number in a simple manner (tag pipelining).

In the case of a write transaction of the processing unit CPU1, following the read transaction, to the data block in the cache memory CACHE1, which has the state E (Exclusive), the writing can be executed locally in the cache memory CACHE1, without having to use the system bus. The state of the data then changes to M (Modified).

When a processing unit different from the unit CPU1 initiates a read transaction to the same data block, the use of the system bus SPBUS occurs in a manner analogous to the previous read transaction by the subscriber TN1. However, now, its cache memory CACHE1 has the desired data block in the state M (Modified), so that by sending out the accompanying signal INT it is indicated that the data are provided from the cache memory CACHE1 and not from the main memory. The state of the data block in the cache memory CACHE1 changes to O (Owned) so that consequently, the cache memory remains responsible for the correctness of this data block. The cache memory of the initiating processing unit stores the data block and assigns it the state S (Shared). Changes of cache memory states are respectively prompted by the test means CCAE-CTR.

If a write transaction of the same processing unit is following thereupon to the same data block of its cache memory, this one cannot be fulfilled locally, since a write event on the data is only possible in the state E (Exclusive), the data block, however, is in the state S (Shared). The write data DATA of the processing unit are nevertheless entered into the appertaining cache memory and, together with the address ADR, in the output buffer OBUF of the control unit CTR-U.

In the same manner as in the read transaction, it is inquired via the signal AD-REQ whether the sub-bus AD-BUS according to FIG. 1 is available for an address operation. If this is affirmed with the signal AD-GRA, the arbitrating unit ARBIT provides a transaction identification number TID which is transmitted on the corresponding address lines respectively together with the address ADR to all subscribers and stored in the means of the respective control unit CTR-U provided therefor at a subscriber. The data operation can occur directly after the address operation in that an assignment of the corresponding sub-bus is requested, so that the data DATA and the assigned transaction identification number are likewise present in its control unit CTR-U. As in the case of the read transaction, the addresses and identification numbers proceed through the memories SYNC-QU, before they are offered to the respective test means of a subscriber.

With the signal SYNC, the test means CCAE-CTR of the subscriber TN1 sets the accompanying signal INT, since the appertaining cache memory CACHE1 comprises the data block affected by the write transaction having the state O (Owned) and thus has the responsibility for the data consistency. The cache memory CACHE1 can now either declare its data block invalid by the state I (Invalid) or take over the write data stored in its buffer memory BUFM. For that purpose, the identification number TID is needed, which must be provided by the memory unit EXEC-QU. In the more simple case of the invalidity declaration, the data block must be characterized by the state M (Modified) via the test means CCAE-CTR of the initiating subscriber which than has the modified data in its cache memory exclusively as the only subscriber.

Besides the read and write transactions, a type of transaction exists whereby no data are transmitted so that only an address operation occurs. Its function thereby lies in the control of the states of the individual cache memory entries.

For the coordination of the processing units in the subscribers, messages are transmitted which merely require address cycles on the system bus. An effective message is, for example, an interruption message through which all addressed subscribers are promoted to determine which of them is processing the lowest-priority event in order to ensure that unavoidable interferences as interrupts optimally only drive out low-priority executions. In providing the signal ACT in connection with the signal SYNC, the subscribers can provide information when a transaction occurs as to whether they have accepted the interrupt. By that, it is prevented that another capacity-restricting interruption must be transmitted as acknowledgement to the sender. If the signal ABORT is present or none of the subscribers has transmitted the signal ACT, the interruption transaction is terminated, and the initializing subscriber decides about further actions, for example in that it repeats the transaction or starts an error search.

Figure 3A:
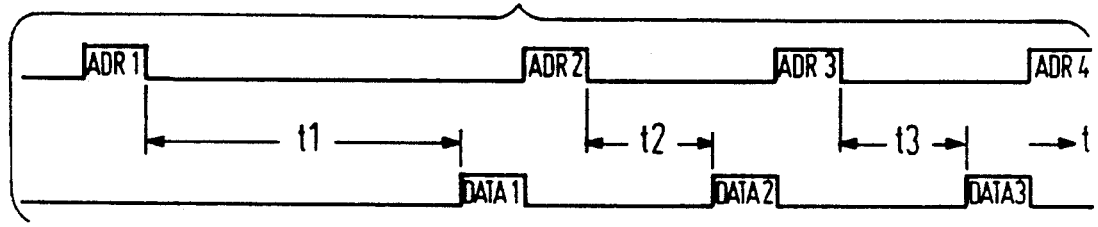
FIGS. 3a, 3b and 3c are timing diagrams illustrating the time conditions during the operation of the system bus in the standard manner and according to the present invention.
Figure 3B:
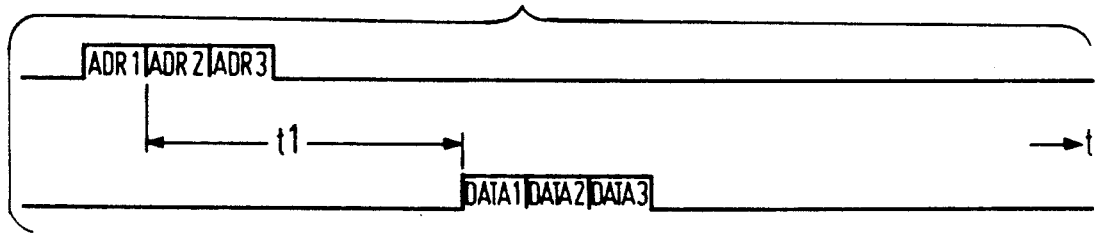
Figure 3C:
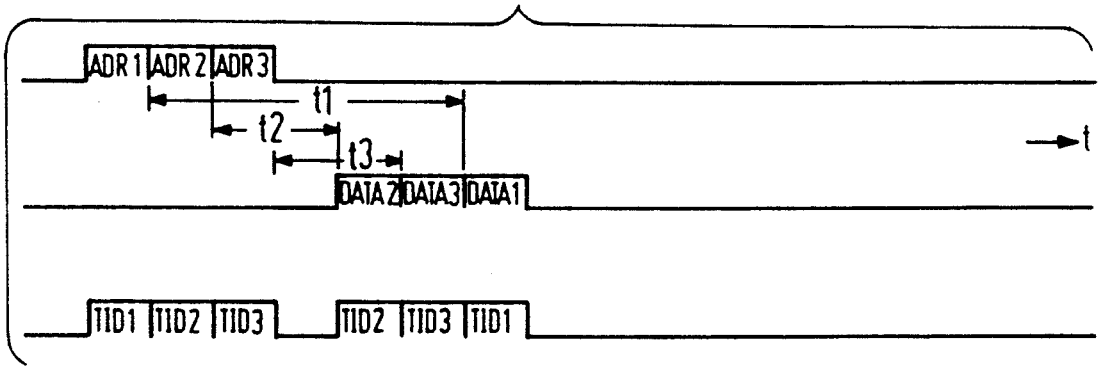

FIGS. 3a-3c exemplifies the advantage of the present invention with a diagrammatic presentation of the time conditions on the system bus SPBUS for various operating modes. FIG. 3a illustrates the bus protocol for a system without a pipeline operation. After starting a transaction via initialization of merely one address operation with the address ADR1, subsequent address ADR2 can only be transmitted when the data DATA1 of the first transaction have arrived after the time $t_1$ for example in the case of a read transaction. The same applies for further accesses to the system bus whereby respectively the arrival of the data DATA2 or DATA3 after the time $t_2$ or $t_3$ is waited for before the respective next address ADR3 or ADR4 can be transmitted. By that, considerable down times already result at the system bus when the access times of the responding subscriber are only slightly greater than zero.

In FIG. 3b, a better use of the system bus can be seen since, via simple pipelining, the developing down times can be used partially via the transmission of further addresses. The transmitted addresses ADR1, ADR2 and ADR3 are processed in parallel by the receivers, and the requested data DATA1, DATA2 and DATA3 are sent back in the sequence of the addresses after the time $t_1$ in order to establish a clear assignment.

The solution to optimize the bus is illustrated in FIG. 3c. Each address ADR1, ADR2 or ADR3 is appended a transaction identification number TID1, TID2 or TID3. This provides that the data responses can occur out of the sequence of the fed addresses ADR1, ADR2, ADR3. The rapid responses via return of the data DATA2 after the time $t_2$ or, respectively, of the data DATA3 after the time $t_3$, earlier, whereas the waiting time for the slow response via return of the DATA1 after the time $t_1$ no longer exists. Therefore, the time that is altogether necessary to perform the three transactions is reduced. The reference to the corresponding address operation is achieved by the transmission of the transaction identification number in the data operation. The prerequisite for the use of this bus protocol is the possibility to store a sufficiently-high number of addresses in a pipeline. For this purpose, a sufficient memory depth of eight entries in the memories was selected.

Apart from the state of the execution of transactions, the system bus SPBUS in the microprocessor system can also be in an error diagnosis as well as in an initialization state. Thereby, different signals corresponding to the obtained system state are transmitted on several bus lines according to FIG. 2. The initialization event takes place controlled by the central arbitrating unit ARBIT and is divided into two phases.

Figure 4A:
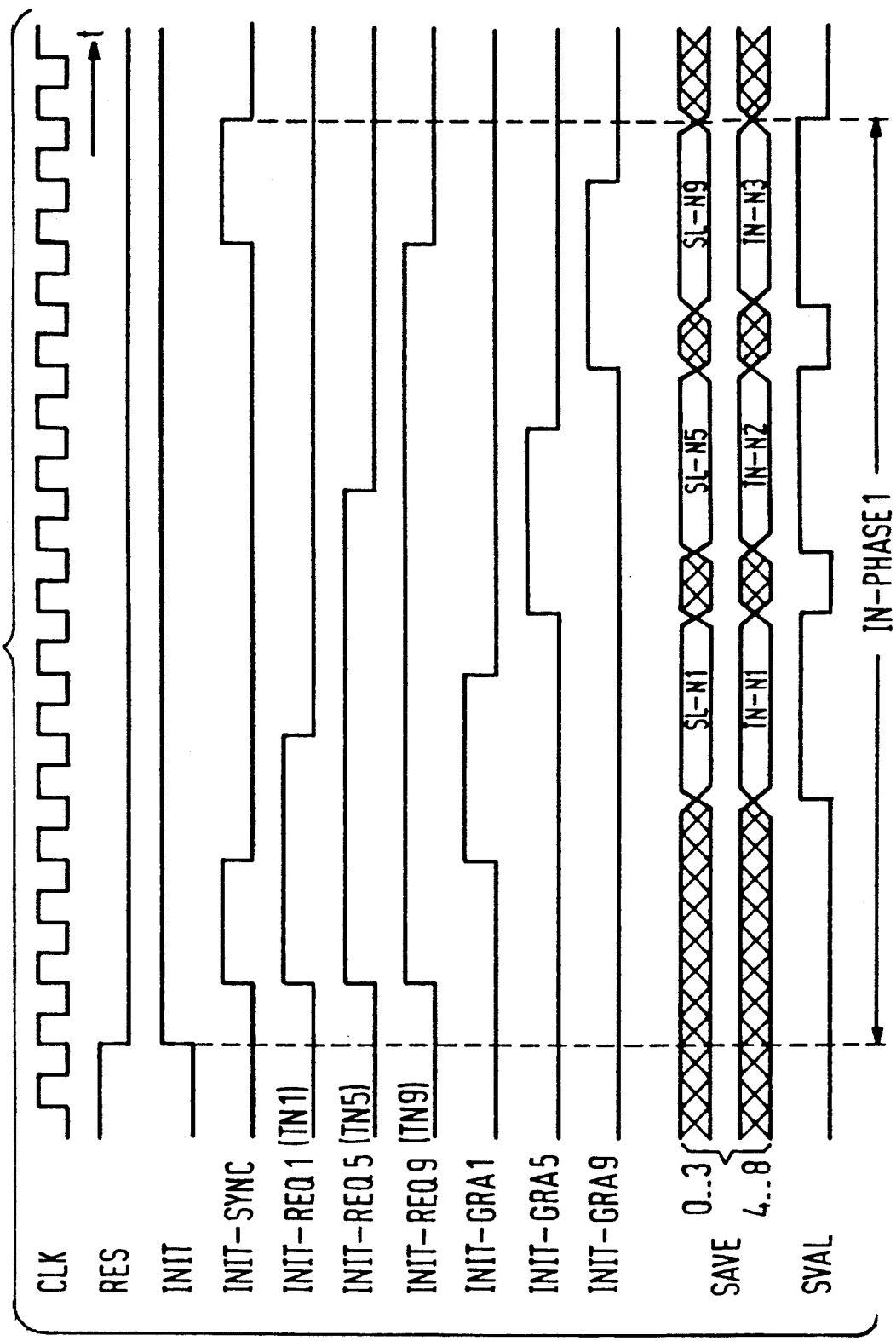

FIG. 4a shows pulse diagrams of the signals occurring in the first initialization phase IN-PHASE1, whereby the individual signal transitions are derived from a central operating clock signal CLK. Before the initialization event on the system bus begins, the signal RES is generated in the central arbitrating unit ARBIT and held transmitted to each subscriber via the sub-bus CTR-BUS according to FIG. 1. By that, all subscribers are prompted to perform a reset of the signal conditions on the lines of the system which have adjusted themselves, e.g. due to priorly-executed operations by the subscribers, so that a start condition is achieved if no error is reported during the reset event. The subscribers are arranged on boards and inserted in slots of a data processing device. For a more simple presentation and better understanding, exactly one subscriber is provided on one board, which also means the least expense regarding the control of the initialization. The allocation of a subscriber number and a slot number via the central arbitrating unit ARBIT occurs in a first initialization phase IN-PHASE1, which is started with the signal INIT to indicate the initialization event on the system bus. A subscriber, e.g. TN1, receives the signal, transmits, after the reception of the signal INT, a synchronization signal as well as an individual transaction signal, e.g. INIT-REQ1, in order to communicate its readiness for the reception of the numbers.

When several subscribers exist on one board, a corresponding number of transaction signals is generated out of which a control unit on the board transmits an individual transaction signal to the arbitrating unit ARBIT, until each subscriber TN has received its number. The other subscribers proceed in the same manner, e.g. the subscribers TN5 and TN9 which, on their part, provide the corresponding signals e.g. INIT-REQ5 and INIT-REQ9, respectively accompanied by their synchronization signal provided individually per subscriber. The individual synchronization signals are fashioned as open-collector signals and have an effect on the system bus as a joint synchronization signal INIT-SYNC only when they are supplied by all subscribers.

When, consequently, the synchronization signal INIT-SYNC is asserted on the system bus for a certain period of time, each synchronization signal provided individually per subscriber is subsequently again reset by the appertaining subscriber, and the arbitrating unit ARBIT can start with the allocation of the numbers. Based on an implemented allocation scheme, the arbitrating unit sets an individual response signal, e.g. INIT-GRA1, with which the transmission of the information signals SAVE is announced to the selected subscriber e.g. TN1. An allocation concept, for example, can be that in a round-robin sequence starting with the slot, the arbitrating unit ARBIT assigns slot and subscriber numbers based on individual transaction signals.

One part of the transmitted information signals, e.g. SAVE0–SAVE3, contains the slot number, e.g. SL-N1, whereas the other part, e.g. SAVE4–SAVE8 indicates the subscriber number, e.g. TN-N1. If several subscribers are on the board, an allocation of the transmitted subscriber number to one subscriber is necessary. This is then done by a control unit arranged on the board. Each one of the signals SAVE0–SAVE8 is carried on one line which corresponds to one bit position of the binarily-coded information. In addition to the information signals SAVE, respectively one signal SVAL is provided by the arbitrating unit ARBIT, which indicates the validity of the transmitted information.

The selected subscriber, e.g. TN1, has received a subscriber number, e.g. TN-N1, and it resets its individual transaction signal, e.g. INIT-REQ1, and activates its synchronization signal. In the same manner, the information signals SAVE are transmitted successively to the other subscribers, e.g. TN5 and TN9, which likewise reset their individual transaction signals, e.g. INIT-REQ5 and INIT-REQ9, and set their synchronization signals.

When the joint synchronization signal INIT-SYNC of all subscribers is asserted for a certain period of time, the individual synchronization signals are afterwards again reset by the subscribers, with which the second initialization phase IN-PHASE2 according to FIG. 4b can begin.

Therein, joint parameters are negotiated depending on the efficiency and performable functions of the subscribers connected to the system bus. The parameters to be determined are, e.g. clock frequency, data width, bus protocol, number of pipelines, number of signal lines to the cache memories, etc., whereby as a first parameter, the number of the parameters to be agreed upon, which one subscriber and the arbitrating unit know, is determined. The individual parameter values themselves correspond to the extent of a function which a subscriber on the system bus can execute, for example, clock frequency 30 MHz, 40 MHz, etc., and are codes that are coded such that increasing values mean higher performance.

As soon as the valid signal SVAL is generated by the arbitrating unit, the transmission of respectively one parameter value via the information signals SAVE begins, whereby the signal SAVE8 indicates whether the transmitted value is the highest possible value. For the first parameter PAR1 to be determined, the individual values PW10, PW11 and PW12 are offered in successive fashion respectively to all subscribers, of which, respectively, after reading the individual values of the subscriber-specific synchronization signal for the acknowledgement of the receipt is set. In setting a further signal INIT-ABORT by at least one of the subscribers, the disagreement with the suggested parameter value, e.g. PW12, is declared. This is possible because the accompanying signal INIT-ABORT which can be set by each subscriber, as well as the synchronization signal is fashioned as an open-collector signal, however, and contrary to the synchronization signal is ORed on the system bus.

When the joint synchronization signal INIT-SYNC formed by all subscribers when activated by one subscriber only is present for a certain period of time, the individual synchronization signals and the possibly-set accompanying signals INIT-ABORT are reset by the subscribers, whereupon the subsequent parameter value transmission can follow. If the accompanying signal INIT-ABORT is set, the parameter value, e.g. PW11, determined in the respectively preceding negotiation event, is stored in the subscribers and in the arbitrating unit as a joint parameter PAR1 since it represents the highest value tolerated by all subscribers.

In the determination of further parameters PAR2, the arbitrating unit generates, e.g. the information signal SAVE8, which characterizes the transmitted parameter value PW22 as the highest value to be negotiated. With none of the proposed parameter values PW20, PW21 and PW22, whose information signals SAVE respectively to be transmitted are declared valid by the signal SVAL in an analog manner to the first initialization phase, has a disagreement been disclosed of at least one of the subscribers so that the value PW22 counts as the joint parameter PAR2, since no further values are available for this parameter.

When the last-negotiable parameter has been determined, this is indicated to all subscribers by the arbitrating unit ARBIT by resetting the signal INIT. In the case that the accompanying signal INIT-ABORT appears at the respective-lowest value of a negotiation event for a parameter, an error signal is released leading to the premature termination of the initialization event.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A multiprocessor system for supporting multiple transactions on a synchronous system bus, said synchronous system bus comprising an address bus, a data bus and a synchronization bus, said transactions respectively including an address operation or an address operation and a data operation, comprising:

a plurality of bus devices connected to said system bus, each of said bus devices comprising a processor including corresponding private cache memory and being operable to request access to said address bus for broadcasting an address on the address operation of a transaction;

a main memory shared by all of said processors and connected to said system bus as a bus device;

a central arbitrator connected to said system bus for granting access to said address bus and generating a transaction identification number on each address operation for broadcasting said number together with the address on the address bus to all of said bus devices;

a plurality of storage means, each in a respective bus device, comprising a buffer memory for storing the address broadcasted on the address bus in a memory location which is identically addressed in all bus devices by an individual address information derived from the transaction identification number broadcasted on the address bus and comprising a sync queue in which said transaction identification number and address are stored as an entry;

a plurality of control means, each in a respective bus device, connected with said sync queue and said synchronization bus, comprising means for reading an entry in said sync queue, means for examining the address of said entry for an existence of data in the main memory or for a hit in the cache memory of each processor;

means for checking the cache memory for responsibility of maintaining data consistency between the cache memories and the main memory by means for assigning cache states to each cache memory entry and by means for indicating that data in the cache memory are not identical with corresponding data in the main memory, because the data in the cache memory are modified;

means for approving an initiated transaction by asserting a sync signal on said synchronization bus as soon as the address provided on the address operation of said transaction is examined;

means for requesting for an access to the data bus to transmit the data together with the transaction identification number provided on the respective address operation of said transaction to the bus device which has initiated the transaction;

means for storing said transmitted data in the buffer memory of said bus device in the memory location addressed by individual address information derived from said transaction identification number transmitted on the data bus; and means for writing said transmitted data in the cache memory of each respective processor as soon as said transaction is approved by all bus devices asserting the sync signal.

2. The multiprocessor system of claim 1, wherein:

a plurality of processors for supporting input/output transactions are additionally connected as bus devices to said system bus and are connected to a separate input/output bus.

3. The multiprocessor system of claim 1, wherein:
each of said control means comprises means for asserting signals while the sync signal is asserted, from which a first signal indicates an abortion of the initiated transaction, a second signal indicates an intervention of a processor whose cache memory is responsible for maintaining data consistency and that provides the data, and a third signal indicates that a copy of the data involved in the transaction is present in the cache memory of the processor.

4. The multiprocessor system of claim 1, wherein:
each of said control means comprises means for asserting a signal while the sync signal is asserted which indicates that an interruption message initiated by an address operation has been accepted.

5. A method for initialization of a multiprocessor system including a synchronous system bus, said system bus comprising an address bus, a data bus and a synchronization bus, a plurality of bus devices and a central arbitrator, which are connected to said system bus, comprising the steps of:
assigning a slot number and a device number to each of said bus devices residing in slots by:
each of said plurality of bus devices asserting an individual signal on the address bus to indicate readiness for beginning of the initialization;
said central arbitrator communicating a slot number and a device number to each of said plurality of bus devices by transmitting information signals on said address bus, said plurality of bus devices selected by an implemented allocation scheme based on said individual signals; and
each of said plurality of bus devices deasserting the individual signal and asserting a synchronization signal on the synchronization bus to indicate receipt of the numbers;
establishing a consensus among all bus devices on parameters for accomplishing compatibility, each of said parameters comprising individual parameter values respectively corresponding to an extent of a function to be performed on the system bus by all bus devices, by:
said central arbitrator communicating the individual parameter value of each parameter one after another to all bus devices by transmitting information signals on said address bus; and
transmitting an information signal to indicate if the communicated parameter value is the last individual parameter value of a respective parameter;
each of said plurality of bus devices storing the individual parameter value communicated in the respective transmission temporarily and asserting the synchronization signal onto the synchronization bus to indicate that an individual parameter value is received and stored;

said central arbitrator communicating the subsequent individual parameter value of the respective parameter when the synchronization signal has been asserted by all bus devices on the synchronization bus;
each of said plurality of bus devices and said central arbitrator storing the individual parameter value communicated in the respective transmission permanently as a joint parameter value which can be used by all of said plurality of bus devices if the last individual parameter value of the respective parameter indicated by said information signal has been transmitted;
each of said plurality of bus devices asserting an abortion signal on the synchronization bus to indicate a disagreement with the communicated individual parameter value if said bus device does not consent to the individual parameter value transmitted on said address bus;
each of said plurality of bus devices and said central arbitrator storing the individual parameter value communicated in the respective preceding transmission permanently as a joint parameter value which can be used by all of said plurality of bus devices if the abortion signal is asserted from at least one of the bus devices; and
said central arbitrator continuing said communication of individual parameter value with a first individual parameter value of a subsequent parameter if the abortion signal is asserted from at least one of the bus devices.

6. The method for initialization set forth in claim 5, including the step of:
each of said plurality of bus devices deasserting the asserted synchronization and abortion signals when the synchronization signal has been asserted by all bus devices on the synchronization bus.

7. The method for initialization set forth in claim 5, and further including the step of:
said central arbitrator asserting a signal which indicates communicating of a next parameter value as soon as the synchronization signal has been deasserted for a preceding parameter value.

8. The method for initialization set forth in claim 5, and further including the step of:
said central arbitrator asserting a signal which is communicated to all bus devices to indicate the beginning of the initialization and deasserting the signal for indicating ending of the initialization.

9. The method for initialization set forth in claim 5, and further including the step of:
said central arbitrator asserting an error signal if the abortion signal is asserted to a parameter value first communicated for each parameter from at least one of the bus devices.

* * * * *